Feb. 6, 1968  G. W. BAUGHMAN  3,368,072
VEHICLE SPEED CONTROL SYSTEM
Filed Jan. 3, 1966  2 Sheets-Sheet 1

INVENTOR.
George W. Baughman.
BY W. L. Stout
HIS ATTORNEY

United States Patent Office 3,368,072
Patented Feb. 6, 1968

3,368,072
VEHICLE SPEED CONTROL SYSTEM
George W. Baughman, Swissvale, Pa., assignor to Westinghouse Air Brake Company, Swissvale, Pa., a corporation of Pennsylvania
Filed Jan. 3, 1966, Ser. No. 518,312
20 Claims. (Cl. 246—63)

This invention relates to a vehicle speed control system for vehicles traveling along a predetermined way.

More specifically, this invention relates to a vehicle speed control system where there is positioned along a predetermined way a pair of electrically continuous control circuits. Each one of the pair of control circuits is comprised of a series of electrically connected individual sets of parallel circuits. One circuit of each of the sets of parallel circuits has a preselected impedance, while the other circuit of the parallel set has a substantially constant impedance. The pair of control circuits which include the individual sets of parallel circuits are energized by a source of energy positioned along the wayside.

The vehicle, whose speed is to be controlled, carries a first pair of serially connected signal detectors, each one of which is positioned on the vehicle to detect the presence of energy respectively in each one of the circuits of substantially constant impedance as the vehicle moves along the way.

There is in addition, a second pair of signal detectors each positioned on the vehicle to detect the presence of energy respectively in each of said circuits of preselected impedance as the vehicle moves along the way. A pair of signal phase comparators are respectively connected to an individual signal detector of the second pair of signal detectors. The first pair of serially connected signal detectors are electrically connected to both of the signal phase comparators and provide to the signal phase comparators a reference signal, while each of the signal detectors of the second pair of signal detectors provides to each of the phase comparators a signal which is indicative of the impedance present in the circuits having the preselected impedance. Each one of the signal phase comparators has an output which represents the phase differential between the reference signal and one of the signals from one of the second pair of signal detectors.

Finally, there is a vehicle speed selector mechanism controlled by the outputs from the pair of signal phase comparators. This vehicle speed selector mechanism has an output which bears a direct relationship to the combined impedances present in the circuits of preselected impedance as the vehicle moves along the way.

In all forms of ground based rapid transit there is a constantly increasing need to spot a vehicle and control its speed. In train applications there are definite regions in the systems where precise location and predetermined speed control of the trains moving within the system are essential. Typical regions appear at all train stations where trains must be accurately brought to a precision stop. Curves in the track as well as speed limitations brought about by community regulations governing the speed of trains in certain areas, all call for precise spotting of the trains and simultaneous speed control. In train operation the increased use of electrically continuous rail has magnified the problems of spotting and speed control in that there are not present the great number of track sections which are insulated one from the other and which track sections provide therefor definitive train detection sections.

The invention to be described more fully hereafter provides a unique solution to these just noted problems. In setting forth a solution to these problems the instant invention also embraces a solution to similar problems which will arise in rapid transit systems of the future where vehicle control on highways will emanate from control circuits in the road beds as well as the wayside.

It is, therefore, an object of this invention to provide a unique means of identifying predetermined sections of a vehicle traveled way, with the simultaneous control of vehicle speed as a function of the section of the way which the vehicle occupies.

Another object of this invention is to provide a rapid transit train control system to accurately stop trains at a station platform.

Another object of this invention is to provide a unique train spotting and train speed control in territories utilizing electrically continuous rail.

Another object of this invention is to provide fail-safe vehicle detection and vehicle speed control when the vehicle is operating within the system embodying the invention.

In the attainment of the foregoing objects the invention will be described in a rapid transit application utilizing a train operating on electrically continuous rail. These just noted rails form a part of a pair of control circuits to be described more fully hereafter. The rails and included control circuits are energized by a source of alternating current energy from the wayside.

Each of the control circuits has in a portion thereof a series of electrically connected individual sets of parallel circuits. One circuit of each of the sets of parallel circuits has a preselected impedance, while another one of the circuits of each of the sets includes a portion of one of the rails, which portion of rail has a substantially constant impedance. The just noted sets of parallel circuits are grouped to define a series of consecutive control sections along the rails.

The remaining equipment to be described is carried by the train and includes a first pair of serially connected signal detectors each positioned on the train to inductively detect the presence of energy in the rail circuits of substantially constant impedance as the train travels along the rails. The energy or signal delivered from this first pair of signal detectors provides a reference signal.

A second pair of train-carried signal detectors are each positioned on the train to inductively detect the presence of energy respectively in each of the circuits of preselected impedance and produce a signal indication of this preselected impedance as the train moves along the rails.

A pair of signal phase comparators each receives the reference signal from the first pair of signal detectors as well as a signal from each one of the signal detectors of the second pair of signal detectors.

Accordingly, each one of the signal phase comparators has an output which represents the phase differential between the reference signal received and the signal from one of the second pair of signal detectors. The outputs from the pair of signal phase comparators in turn control a train speed selector mechanism. The train speed selector mechanism accordingly has an output which is indicative of the particular control section which the train occupies.

Other objects and advantages of the present invention will become apparent from the ensuing description of illustrative embodiments thereof, in the course of which reference is had to the accompanying drawings in which.

A description of the above embodiment of the invention will follow and then the novel features of the invention will be presented in the appended claims.

Figure 1:
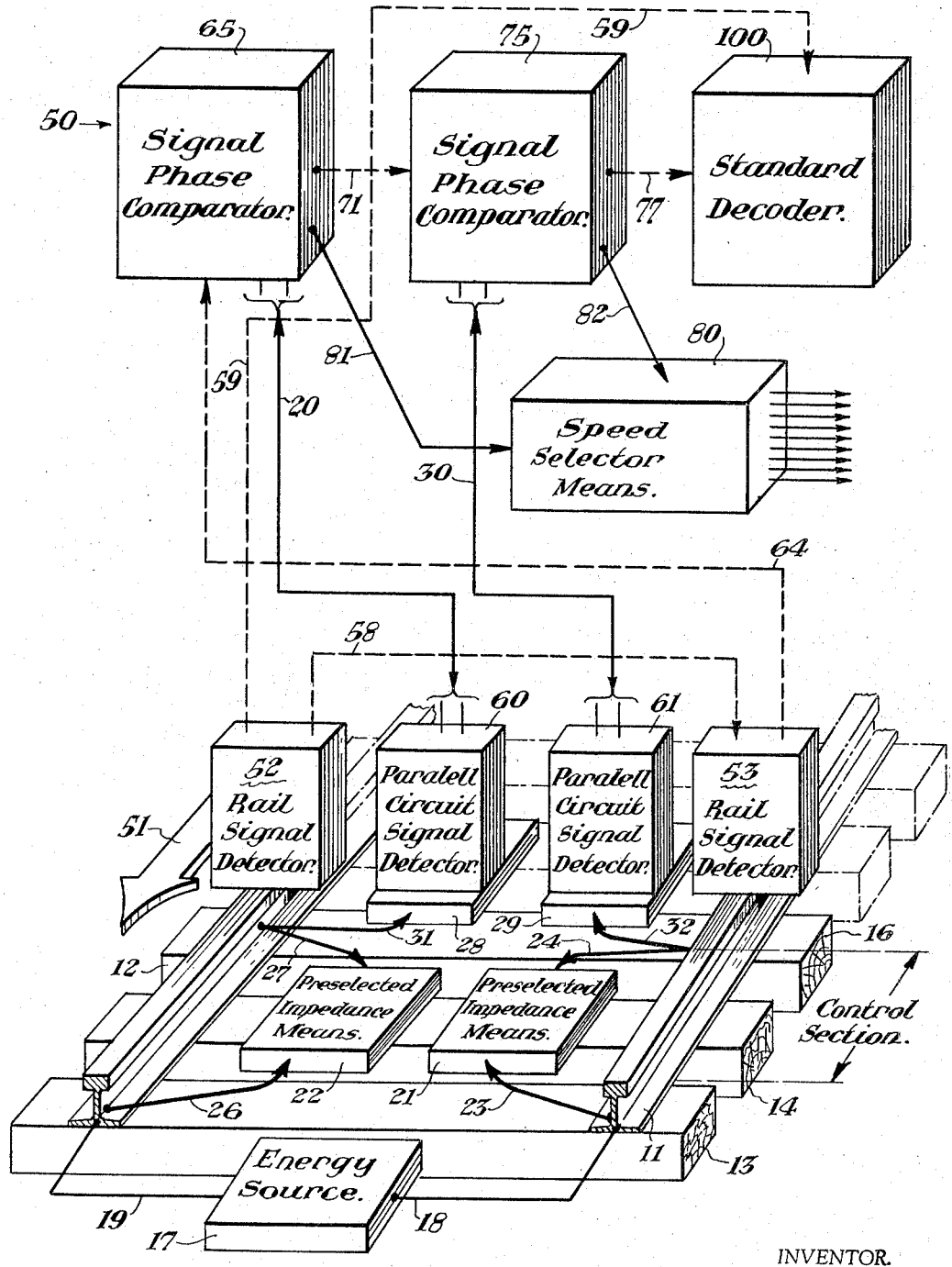
FIG. 1 illustrates in block diagram form an embodiment of the train detection and the train speed control system of the invention.

Reference is now made to FIG. 1 which depicts in a three-dimensional form a block diagram of the system that includes the invention, which invention will be described more fully hereafter. Basically, this figure sets forth the preferred embodiment in which the invention will be described, namely, there is a pair of rails 11 and 12 which are supported by a series of railroad ties 13, 14 and 16 in a conventional manner. Each of the rails 11 and 12 receives energy from an energy source 17 via the electrical leads 18 and 19. The delivery of electrical energy to the rails is also provided in a conventional manner. The energy source 17 may have a coded alternating current form of energy and this coded alternating current energy may carry information to the rails to be utilized by the train in a manner which will be described hereafter.

Electrically connected to the rails 11 and 12 are a series of sets of parallel circuits, each of the parallel circuits including a preselected impedance means 22, 21, 28 and 29. Only four of these sets of parallel circuits have been shown in this figure. These sets of parallel control circuits are to be designated as detection sections or control sections, and it is to be understood that where more detection sections or control sections are needed, these sets of parallel circuits just mentioned will be located along the rails. It is important to recognize that in modern mass transit one of the preferred forms of propulsion is that of the electric motor. In situations where the propulsion is by electric motor and the power to drive the train comes from the wayside or a catenary positioned above the track, the rails 11 and 12 are utilized as a pair of propulsion return paths for the power being delivered to the train's propulsion motor. Accordingly, when the rails are used as propulsion return paths, it becomes desirable in many instances to have electrically continuous rails. The electrically continuous rails magnify the problem of providing control sections along the rails, which problem is answered by the presence of insulated track sections where no electrically continuous rail is present. It should be understood that while this invention is being described in an environment where there are electrically continuous rails, the invention may find use in train territory where there are insulated joints and there is a desire to provide a number of definitive control or detection sections intermediate any two consecutive insulated sections of rail.

It should also be understood that while this invention is being described in a train rapid transit environment, the broader aspects of this invention are equally applicable to those rapid transit situations where the control of the vehicle moving along the way comes from the wayside, or in the alternative where the control of the vehicle originates in the roadbed of the way. This last noted situation would arise where control circuits are positioned underneath the surface of a highway to control a vehicle traveling thereon. It will be appreciated that since all of the signal information that appears in the circuitry to be described is inductively picked up and utilized, this invention is equally applicable to those rapid transit situations where the control circuitry which includes the electrically continuous elements and the series of preselected impedances are positioned either in the bed of the road or in a position parallel to the wayside on which the vehicle is traveling.

As has been noted, a number of control sections are defined along the electrically continuous rails 11 and 12. One of the typical control sections shown in FIG. 1 includes the preselected impedance means 21 with its related electrical connections 23 and 24, which electrical connections 23 and 24 are electrically secured to the rail 11. This preselected impedance means 21 forms a parallel circuit with the rail 11. It should be understood that since the rail 11 is of substantially constant configuration throughout the system, this rail 11 will present a relatively constant impedance to the energy being delivered to the rail 11 from the energy source 17. By the same token, since the impedance means 21 may be varied according to a desired pattern for any control section, this impedance means 21 will have different impedance values dependent upon the desired program of train control. As part of this control section now being described, there is a preselected impedance means 22 which is electrically secured to the rail 12 via the leads 26 and 27. The preselected impedance means 28 and 29 of the sets of parallel circuits in the next consecutive section depicted along the rails 11 and 12, respectively, include the electrical leads 31 and 32. This second consecutive control section has only been shown partially and it will be understood from a study of FIG. 2 the precise manner in which the control section may be varied in accordance with this invention to provide the predetermined control of the vehicle moving along the way.

In the environment illustrated in FIG. 1, a train (not shown) with its train-carried equipment 50 shown in block diagram form includes the essential components of this invention. The train-carried equipment 50 and the direction of the train's travel have been designated by the arrow 51 shown to the left in FIG. 1. Accordingly, this train-carried equipment includes a pair of rail signal detectors 52 and 53. Both of these rail signal detectors detect the presence of energy in the rails 12 and 11, respectively. These rail signal detectors are induction type apparatus and detect the presence of energy that appears in the rails 11 and 12 as the train moves along the track. Each of these rail signal detectors 52 and 53 is part of a series circuit. This series circuit is shown by a dotted line connection between the various blocks shown in this figure. Accordingly, the rail signal detector 52 is connected electrically via the electrical lead 58 to the rail signal detector 53, and the rail signal detector 53 has an output which is connected in series with a signal phase comparator 65 by an electrical connection 64. The signal phase comparator 65 forms a part of this series circuit and is electrically connected by the dotted electrical leads 71 to a second signal phase comparator 75, and this signal phase comparator 75 is in turn serially connected via the electrical leads 77 to the standard decoder 100.

The series circuit which includes the rail signal detectors 52 and 53 is completed via the electrical lead 59 which emanates from the rail signal detector 52, and this electrical lead 59 is connected to the standard decoder 100. The function of the standard decoder will be explained more fully hereafter but suffice it to say that the standard decoder is the type of decoder normally found on trains and performs the function of interpreting the information that appears in coded form in the rails 11 and 12. This coded information, as noted earlier, originates in the coded energy source 17.

There is in addition to the pair of rail signal detectors 52 and 53 a second pair of detectors which have been designated parallel circuit signal detectors 60 and 61. Each of these parallel circuit signal detectors is positioned on the train in such a manner that they inductively receive or detect energy present in the circuits which include the preselected impedance means 22 and 21, as well as 28 and 29 while the train is moving along the rails. While this figure sets forth an environment in which the preselected impedance means such as 22 and 21, which are connected in parallel to the rails 12 and 11 and positioned between the rails 11 and 12, it should be understood that these parallel circuits which include the preselected impedance means may be positioned at a point remote from the rails. The only requirement is that the preselected impedance means maintain their parallel relationship with a control section of the rail. These preselected impedance means depicted in this figure may also be positioned outside of the rails at a point along the wayside. The only modification of the train-carried equipment would be the necessity of positioning the parallel circuit signal detectors 60 and 61 on the train to inductively detect the presence of energy in these preselected impedance portions of the parallel circuits which are utilized to define the control sections along the way.

Each of the parallel circuit signal detectors 60 and 61 has outputs 20 and 30, respectively, each of which delivers a signal from the parallel circuit signal detectors 60 and 61. This signal that appears on the outputs 20 and 30 reflects the impedance present in the parallel circuits as a vehicle, in this case, the train passes along the rails.

Up to this point the nature of the preselected impedance means has not been discussed. For purposes of this illustration the preselected impedance means will be discussed in terms of being either a pure capacitor type impedance or a pure inductance type impedance. Where a capacitor type impedance is present, the current will lead in phase the voltage appearing across the preselected impedance means while the current will lag in phase the voltage impressed upon an inductance type impedance. Therefore, it will be seen that the parallel circuit signal detectors 60 and 61 will deliver one of three distinctive signal outputs on outputs 20 and 30. Namely, if the parallel circuit signal detector 60 is passing over a capacitor type impedance, a signal will appear and be delivered to signal phase comparator 65 in the case of parallel circuit signal detector 60, and this signal will have its current leading the voltage in phase. If the parallel circuit signal detector 60 should be passing over an inductance type impedance instead of a capacitor type impedance, the current will lag in phase the voltage. Note, of course, that where there is no impedance or inductance present, the current will not lag or lead the voltage, and therefore the third output, or third condition as it may be stated, is one where no lagging or leading signal whatsoever appears in the output 20 of the parallel circuit signal detector 60.

As has been noted, the parallel circuit signal detector 61 has a similar series of three distinctive conditions possible as did the parallel circuit signal detector 60, namely, the parallel circuit signal detector 61 may detect the presence of a capacitor type impedance, an inductance type impedance, or the absence of any lagging or leading signal. Each of the parallel circuit signal detectors 60 and 61 delivers its output respectively via outputs 20 and 30 to signal phase comparators 65 and 75. As has been noted earlier, a signal indicative of the impedance of the rails 11 and 12 has been delivered via the dotted series connection described earlier to each of the signal phase comparators 65 and 75. These signal phase comparators 65 and 75 receive the outputs from the serially connected rail signal detectors 52 and 53, and the output which these rail signal detectors 52 and 53 deliver is representative of a reference signal against which the parallel circuit signal detectors 60 and 61 and their respective outputs 20 and 30 will be compared. The differential in the phase of the current being delivered to the signal phase comparators 65 and 75 will produce a pair of outputs 81 and 82, respectively, from the signal phase comparators 65 and 75, which outputs 81 and 82 are received by a speed selector means 80. The function and manner of operation of speed selector means 80 will be described more fully hereafter. All that need be said at this point is that the speed selector means 80 will provide a number of distinctive outputs dependent upon the pattern of the signals appearing on the outputs 81 and 82 from the signal phase comparators 65 and 75.

Figure 2:
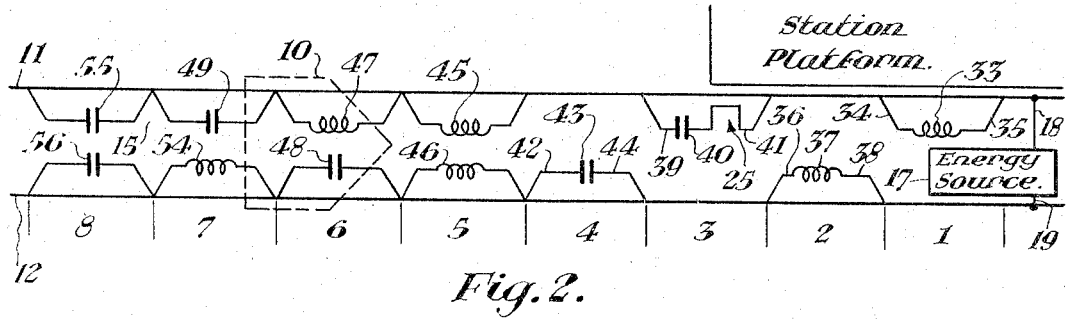
FIG. 2 illustrates a typical section of track embodying the control sections of the invention.
Figure 3:
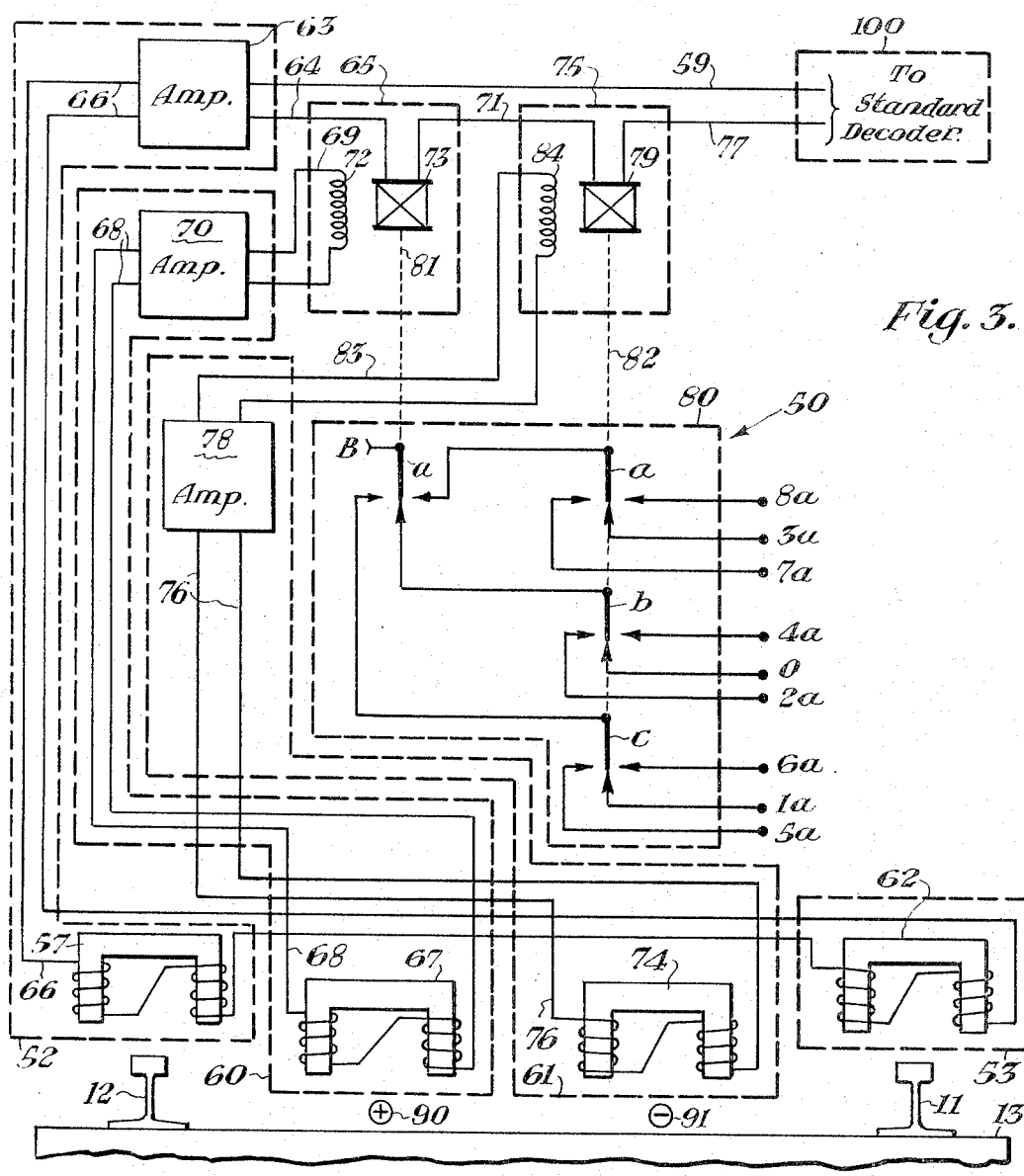
FIG. 3 is a circuit diagram of the system set forth in FIG. 1.

Reference is now made to FIG. 2, which depicts in schematic form the rails 11 and 12 and a series of control sections 1 through 8. FIG. 2 illustrates one employment of this invention, namely, that portion of track just before the station platform which has been depicted in the upper right-hand portion of this figure. The need to precisely control trains as they enter a station and come to a stop has been a long standing and continuously vexing problem in the field of rapid transit. It should be recognized that while this FIG. 2 sets forth an environment in which eight control sections have been employed and this invention, as depicted by FIGS. 2 and 3, will be discussed in a train stopping environment at a station platform, the control sections of the type to be discussed hereafter may find equal use in other areas of rapid transit. The invention may be utilized wherever there is a need to control the speed of a train at any point along a section of rail. Typical examples that arise where a predetermined speed is essential or may in fact be required will occur on certain curved sections of track where an excessive speed may be harmful, or in the alternative where a train enters a congested area and the traffic pattern requirements are such that the train must proceed at a predetermined speed through that particular section. Accordingly, the control sections being described may find equally applicable use at a number of different locations along the way on which a vehicle is traveling.

FIG. 2 sets forth a pair of rails 11 and 12 and these rails 11 and 12 have been divided into a number of control sections 1 through 8. Connected across the rails 11 and 12 is the energy source 17 of the type described with reference to FIG. 1, this energy source having electrical leads 18 and 19 connecting the source 17 with the rails 11 and 12, respectively. There is in the first track detection section an inductance 33 positioned in parallel with the rail 11 and connected to the rail by electrical leads 34 and 35. Opposite the inductance 33 a portion parallel to the track 12 is not occupied by any parallel circuit. The effect of this will be understood more fully when FIG. 3 is described. Control section 2 has included therein an inductance 37 electrically connected by electrical leads 36 and 38 to the rail 12. Here also there is no parallel circuit connected to the rail 11 in this control section. Control section 3 has a parallel circuit depicted, which parallel circuit includes a capacitance 40 electrically connected in parallel to the rail 11 via electrical leads 39 and 41. This section is shown modified in one of the many possible configurations which the control sections may take. In this instance the electrical lead 41 has been shown in a region 25 brought next to the rail 11. In this configuration the signal detector positioned on the train to detect the presence of energy in this parallel circuit would pass over the parallel circuit with its capacitance 40, but upon reaching the region 25 there would be a cessation of the signal being detected and this would produce a controlling action to be described hereafter.

In other words, while each of the control sections set forth in FIG. 2 illustrates a typical parallel circuit, these parallel circuits may be modified to establish a predetermined pattern of speed control within the particular control section. This predetermined pattern of detecting the energy present in and the resultant effect on the signal detectors will provide an additional form of control which will be more fully understood after a study of FIG. 3.

Moving to the next control section 4, a capacitance 43 is electrically connected in parallel via the leads 42 and 44 to the rail 12. The control sections 5 through 8 all include two pairs of control circuits, and the control circuit of section 5 is comprised of the two preselected impedances formed by inductances 45 and 46. The control section 6 has present therein in the parallel circuits an inductance 47 and a capacitance 48.

The control section 7 has an alternate form of the combination of capacitance and impedance in that the inductance 54 is connected to the rail 12 while the capacitance 49 is connected to rail 11. The last control section 8 has a pair of capacitances 55 and 56 connected respectively to rails 11 and 12. The invention also contemplates the situation such as that illustrated by the control sections 7 and 8, that where two separate capacitances, such as 55 and 49, have been shown in consecutive control sections, the need to electrically connect each of the capacitances to the rail 11 may be obviated by the insertion of an electrical connection 15 shown dotted in this figure. In this particular situation the capacitances 55 and 49 would have substituted therefor a capacitance not shown. The capacitance substituted would have a value selected to be approximately equal to the sum of the capacitances 49 and 55.

In FIG. 2 there is also depicted in a dotted line outlined fashion a train 10 traveling along the rails 11 and 12. The manner in which the train 10 has its speed controlled will be explained more fully with reference to FIG. 3. While the train 10 does not show therein the inclusion of train-carried equipment, it will be understood that the train 10 carries the train-carried equipment shown in FIG. 3 designated by the reference numeral 50 and its related arrow.

Reference is now made to FIG. 3 which depicts an embodiment of the invention and sets forth the complete circuit connections to provide an operative arrangement for the invention.

Wherever possible similar reference numerals have been used in order that FIGS. 1, 2 and 3 bear a relationship which aids in the continuity of understanding. Accordingly, where possible the blocks depicted in FIG. 1 have been shown in dotted outline form in FIG. 3, and wherever an electrical connection is the same as in an earlier figure, the same reference numeral has been used in FIG. 3.

Now specifically with reference to FIG. 3, there will be seen at the base of this figure the rails 11 and 12 shown in section, each of these rails having the energy delivered to it in a manner set forth in FIGS. 1 and 2. Positioned between the rails 11 and 12 are a pair of parallel circuits 90 and 91, both shown in cross section. These circuits 90 and 91 are intended to convey the concept of a typical cross-sectional portion of one of the parallel circuits which includes either a capacitance or an inductance type impedance of the type set forth in FIG. 2.

Positioned over the rail 12 is a rail signal detector 52 shown in dotted outline. This rail signal detector 52 includes a receiver coil 57 positioned on the train immediately over the rail 12. This receiver coil 57 has an electrical lead 66 wound thereabout and this electrical lead 66 serially connects the receiver coil 57 with a receiver coil 62 on the rail signal detector 53 depicted immediately above the rail 11. The electrical lead 66 that emanates from the receiver coil 62 delivers the signals detected by the receiver coils 57 and 62 via the electrical connection 66 to an amplifier 63 positioned at the top of FIG. 3.

Since the rails 11 and 12 are of substantially constant impedance, the signal received by the receiver coils 57 and 62 will provide a reference signal, which reference signal will be amplified by amplifier 63 and delivered to both signal phase comparators 65 and 75. The reference signal from the amplifier 63 will be delivered via the electrical lead 64 to the signal phase comparator 65 and its three-position relay 73. The reference signal in turn will pass through one winding of the three-position relay 73 and along electrical lead 71 to provide a reference signal to the signal phase comparator 75. This reference signal on electrical lead 71 will enter one winding of the three-position relay 79 and thence the reference signal will pass along electrical lead 77 to the standard decoder 100. In parallel with the series circuit that includes the electrical lead 64, three-position relay 73, electrical lead 71, three-position relay 79, and the electrical lead 77 is a parallel electrical lead 59 which is electrically connected to the standard decoder 100. Accordingly, the amplifier 63 not only will provide a reference signal to the signal phase comparators 65 and 75 but will simultaneously present to the standard decoder 100 a signal which will have impressed thereon the coded information being delivered by the energy source through the rails 11 and 12. This information in coded form may be utilized to provide additional control functions for the train.

A second pair of signal detectors 60 and 61 include receiver coils 67 and 74. Each of the parallel circuit signal detectors 60 and 61 is positioned on the train so that they pass within a reasonable distance of the parallel circuits 90 and 91, and in so passing inductively receive or detect energy present in the circuits 90 and 91.

The parallel circuit signal detector 60 has an electrical lead 68 wound about the receiver coil 67, the electrical lead 68 being electrically connected to the amplifier 70. The receiver coil 67 will detect and preserve the phase relationship of the current versus the voltage being detected in the parallel circuit 90. If the parallel circuit 90 is of a capacitive nature, then the current will lead the voltage by an amount determined by the capacitance of the circuit, and if the receiver coil 67 of the parallel circuit signal detector 60 passes over an inductance, the current detected will be of a lagging nature, that is, the current will lag the phase of the voltage and this signal will be delivered via the electrical lead 68 to amplifier 70. The amplifier 70 in turn delivers the received and amplified signal via the electrical lead 69 to winding 72 which is adjacent the three-position relay 73. Depending upon the phase relationship of the signal present in the winding 72, the relay 73 will be actuated to either bring its contact a into contact with the reverse contact or the normal contact, dependent upon the phase relationship of the signal. Where there is no phase difference present in the signal being delivered by the amplifier 70 and the reference signal from amplifier 63, the contact a will remain in a neutral position and the contact a will be made over the back contact of this relay.

For purposes of understanding the operation of this device it will be presumed that when a capacitor parallel circuit is passed over and a leading current is detected, amplified, and presented to the three-position relay 73, the contact a will move into contact with the reverse contact completing a circuit therewith. On the other hand, when an inductance is present in the circuit 90, the lagging current which has been detected will be amplified and delivered to the winding 72, and the three-position relay 73 will be actuated so as to cause contact a to come into contact with the normal contact completing a circuit therewith. In the absence of either a lagging or leading phase current signal being detected, the contact will remain in its neutral or deenergized position and complete a circuit over the back contact a of the relay 73.

The second parallel circuit signal detector 61 in a similar manner has a receiver coil 74 positioned on the train immediately above the portion between the rails which contains the parallel circuit 91. This receiver coil 74 will detect the presence of energy and transmit this detected energy via the electrical lead 76 to the amplifier 78. This signal which has the phase of the current impressed thereon upon amplification will then travel along the electrical lead 83 to the winding 84 where the presence of a lagging or leading current will actuate the three-position relay 79 in the same manner that the three-position relay 73 was actuated. Therefore, when a capacitance type circuit is passed over by the receiver coil 74 of the parallel circuit signal detector 61, the current detected will lead the voltage and this signal will be amplified by amplifier 78. The signal that appears in the winding 84 will operate the relay 79 to cause its contacts a, b and c to complete a circuit with the reverse contacts of the relay 79. On the other hand, if an inductance is present in the circuit 91, the contacts a, b and c will come into contact with the normal contacts of the relay 79 and complete a circuit therewith. In the absence of either an inductance or capacitance type signal and the presence of only a reference signal to the three-position relay 79, the contacts a, b and c will remain in the neutral or deenergized position and complete a circuit over the back contacts a, b and c of the relay 79. The outputs 81 and 82 of the relays 73 and 79 constitute the same outputs as were depicted in FIG. 1 from the signal phase comparators 65 and 75.

It should be observed that if a capacitance or an inductance should in some way fail in any section 1 to 8 it will cause a speed selection by the speed selection means 80 which is less than the authorized speed for the particular section in which the failure occurred. This fail-safe feature will be more fully explained hereafter.

In the study that follows the train 10 will be assumed to be traveling from the left-hand portion of FIG. 2 to the right, the train first entering control section 8, then 7, and finally to section 1. In the system being described it is presumed that a predetermined pattern of train speed control is desired to bring the train to a smooth stop in front of the station. Accordingly, each of the control sections entered will by design permit a preselected maximum speed. If the train's speed exceeds the preselected maximum speed, then a propulsion motor control or a control of the brakes from the speed selecting means will effect the desired control speed for the control section entered.

Therefore, as the train 10 enters the first control section 8, the receiver coils 67 and 74 of the parallel circuit signal detectors 60 and 61, respectively, will pass over the capacitor circuits of control section 8 which include the capacitors 55 and 56. This will cause a leading current to appear in the windings 72 and 84 of the signal phase comparators 65 and 75 which will produce, as has been noted, an actuation of the respective contacts of each of the three-position relays 73 and 79. In this instance, since both the parallel circuit signal detectors 60 and 61 will be detecting the presence of a capacitive impedance, the following control circuit will be caused to appear and energy will be delivered from the speed selector means 80 as a result of the completion of the following circuit. Energy will pass from the battery terminal B of the speed selector mechanism 80 over the reverse contact *a* of the relay 73, the reverse contact *a* of the relay 79 to the terminal 8*a* where this signal will cause a braking which may be a maximum braking to cause the train to start its deceleration into the station. On the other hand, should it be decided that maximum braking would not be proper, the output appearing on terminal 8*a* could be utilized to produce a motor control which in effect would start the slowing of the train. As the train passes through control section 8, the energized terminal 8*a* of the speed selector means 80 will continue to control the speed of the train. When the train passes out of the control section 8 and into control section 7, the parallel circuit signal detector 60 will continue to detect the presence of a capacitive impedance and the relay 73 will remain in the same energized position it had while the train was in control section 8, namely, the contact *a* of the relay 73 would be completing a circuit over the reverse contact of relay 79. On the other hand, since the parallel circuit signal detector 61 will be passing over an inductance 54 of the control section 7 this inductance will cause a lagging current to appear in the windings of the receiver coil 74. This lagging current signal will be amplified by the amplifier 78 and delivered via the winding 84 to the three-position relay 79. This will result in the contact *a* of the relay 79 assuming a new position where contacts *a*, *b* and *c* of relay 79 will complete a circuit over the normal contact associated with each of the contacts *a*, *b* and *c*. Energy will therefore be delivered through the selector means 80 in the following manner. The energy will be delivered from battery terminal B over the reverse contact *a* of the relay 73, normal contact *a* of the relay 79 to the speed control terminal 7*a* to apply the degree of motor control necessary to control the speed of the train as programmed.

When the train leaves the control section 7 and enters control section 6, the parallel circuit signal detector 60 will be positioned over the parallel circuit which includes the inductance 47 and therefore the signal detected will be at a lagging current and this lagging current signal will be amplified by amplifier 70 which will cause the relay 73 and its contact *a* to change its position to complete a circuit over the normal contact of the relay 73. On the other hand, the parallel circuit signal detector 61 will be passing over the parallel circuit which includes capacitance 48 and therefore cause the contacts *a*, *b* and *c* of the relay 79 to come into contact with the reverse contacts of each of the contacts *a*, *b* and *c* of relay 79. A speed control circuit within the speed control means will be completed in the following manner. Energy will be delivered from the battery terminal B over the normal contact *a* of the relay 73, the reverse contact *c* of the relay 79 to control terminal 6*a* where the appearance of a signal or energy on terminal 6*a* will produce the next degree of speed control desired.

When the train enters the control section 5, parallel circuit signal detectors 60 and 61 will both detect the presence of the inductance 45 and 46 in the parallel circuits. Therefore, there will be detected a lagging current and this lagging current will be amplified by amplifiers 70 and 78, which in turn will cause the signal phase comparator 65 and its related relays 73 and 79 to assume a position where the contact *a* of the relay 73 will complete a circuit over the normal contact and the relay 79 will also complete circuits where possible over the normal contacts *a*, *b* and *c* of relay 79. Control energy will be delivered from the battery terminal B over the normal contact *a* of the relay 73, the normal contact *c* of the relay 79 to terminal 5*a* where a speed command necessary for that control section will be effected by the energization of this terminal.

As the train enters the control section 4, the parallel circuit signal detector 60 will not pass over any parallel circuit and therefore there will be no signal being delivered from the parallel circuit signal detector 60 and consequently the three-position relay 73 will remain in its neutral position. This will allow a circuit to be completed over the back contact *a* of the relay 73. On the other hand, since the parallel circuit signal detector 61 is passing over the capacitance 43 of the parallel circuit in control section 4, there will be a leading current detected and this leading current will be reflected in an actuation of the relay 79 to cause the contacts *a*, *b* and *c* of relay 79 to move into contact with the reverse contacts of this relay. A control circuit will then be completed in the following manner in the speed selector means. Energy will be delivered from the battery terminal B over the back contact *a* of the relay 73, the reverse contact *b* of the relay 79 to the terminal 4*a*. The presence of this signal on terminal 4*a* will in the same manner as described with reference to the other control sections produce a speed command essential for that train control section.

When the train leaves the control section 4 and begins to enter the control section 3, the following will occur: Since the parallel circuit signal detector 60 begins to pass over the parallel circuit which includes capacitance 40, there will be detected the presence of a leading current, which leading current will be transmitted through the amplifier 70 and cause the relay 73 to be energized so that the contact *a* of the relay 73 makes an electrical connection with the reverse contact *a* of this relay. By the same token, since no circuit is being passed over by the parallel circuit signal detector 61, no signal will be delivered via the amplifier 78 of the parallel circuit signal detector 61 and the relay 79 will remain deenergized, and the only circuit that may be completed over the contacts of the relay 79 will be over the back contact *a*, *b* or *c* of this relay. Therefore, a speed control circuit is completed in the following manner: Energy is delivered from the battery terminal B over the reverse contact *a* of the relay 73, the back contact *a* of the relay 79 to the control terminal 3*a*, which energy on terminal 3*a* will produce the desired speed control of the train.

When the train is in control section 3, for purposes of illustration only there has been included a portion of the parallel circuit which includes the capacitance 40 depicted in this parallel circuit physically out of the range of the parallel circuit signal detector 60. This, of course, will bring about the cessation of a signal to the parallel circuit signal detector 60, and when this occurs the parallel circuit signal detector 60 and the parallel circuit signal detector 61 will be producing no signals which will cause the relays 73 and 79 to remain in their neutral position, and the control circuit that would appear in the speed selector mechanism would be one which would deliver energy over the back contact *a* of the relay 73, the back contact *b* of the relay 79 to the terminal O. The appearance of a signal on terminal O might initiate any desired control, for example, the energization of the terminal O might completely remove all train retarding action for a brief instant. The ultimate effect of this type of control within a control section could produce a pumping or pulsating braking action to slow the train. This pulsating braking action would therefore prevent lockup of the train wheels during braking. As a practical matter this variation in the configuration of the parallel control circuits shown in control section 3 would more likely occur in one of the control sections more remote from the station platform.

As the train leaves the control section 3 it will enter the control section 2 and the parallel circuit signal detector 61 will detect the presence of the inductance 37 in the parallel circuit of control section 2 and this will produce a lagging current signal to be amplified by the amplifier 78 which in turn will cause the relay 79 to move its respective contacts *a*, *b* and *c* into position with the normal contacts of this relay. Therefore, the train speed control circuit will be completed from the battery terminal B over the back contact *a* of the relay 73, thence over the normal contact *b* of the relay 79 to the terminal 2*a* of the speed selector means 80.

When the train leaves control section 2 it will enter the control section 1, and in this control section the parallel circuit signal detector 60 will pass over the parallel circuit which includes the inductance 33 which will cause the relay 73 to move its contact *a* into contact with the normal contacts of this relay. The parallel circuit signal detector 61 which passes over an empty section will deliver no signal and the relay 79 will remain in a neutral condition as a result. The final control circuit in the speed selector means 80 will be completed as follows: Energy will be delivered from battery terminal B over the normal contact *a* of the relay 73, the back contact *c* of the relay 79 to the terminal 1*a* of the speed selector means 80 which would probably produce the maximum braking causing the train to halt within the control section 1.

The particular sequence of sections from 8 to 1 has been selected with the fail-safe principle in mind. As the train moves from section 8 in the direction of section 1, it encounters progressively lower speed limits. Thus, if a failure occurs in any section, it should not result in a higher speed limit for the section. This may be clarified by examples. Assume an open in the capacitor circuit 55 of section 8. With this failure, section 8 becomes the equivalent of section 4. In a similar manner, an open in 56 causes section 8 to be equivalent to section 3. If the capacitor 55 should be short circuited, section 8 would approach equivalence to section 6. The reason for this is that there would be some inductance in the leads to the capacitor 55, and, therefore, the circuit would approach that which contains a series reactor. In a similar manner, a short circuit of capacitor 56 causes section 8 to approach equivalence to that of section 7. Likewise, the short circuiting of both capacitors in section 8 causes it to approach equivalence to section 5.

Applying the same assumed failures to section 7 will cause it to have or approach equivalence to sections 2, 3, or 5, depending upon the particular failure.

Failures in section 6 will cause it to have or approach equivalence to sections 4, 1, or 5.

The same analysis applied to the remaining sections will shown an equal or lower speed limit for the section in the event of failure of the phase shifting components.

It has been the purpose of the above description to explain the variety of controls that are possible with this system. It should be recognized though that the graphical depiction of the control sections set forth in FIG. 2 in which each control section is approximately the same length has been done merely for purposes of explanation. Each of these control sections may vary in length depending upon the predetermined program of stopping the train, and while eight control sections have been shown here, it should be recognized that a fewer number of control sections may be employed, or on the other hand, if it is desired to increase the number of control sections, resistance elements may be added to change the impedance of any control circuit and thereby produce a greater number of potential controls for the system. In other words, this system may be expanded or contracted dependent upon the use to which it is to be employed.

It should also be recognized that while this system has been explained in the embodiment of a train rapid transit application it will equally be applicable to those rapid transit applications where the control circuits are embedded in the roadway or placed along the wayside and the information thereon is inductively picked up by the vehicle traveling along the roadbed or along the way. It is also evident that this invention presents a unique speed control arrangement which may be utilized in a variety of different control environments and covers a broad spectrum of vehicle speed control in a number of different rapid transit environments.

While the present invention has been illustrated and disclosed in connection with the details of the illustrative embodiments thereof, it should be understood that those are not intended to be limitative of the invention as set forth in the accompanying claims.

Having thus described my invention, what I claim is:
1. A vehicle speed control system to control a vehicle speed along a predetermined way comprised of
(a) a pair of control circuits positioned along said predetermined way,
each one of said pair of circuits having a series of electrically connected individual sets of parallel circuits, one circuit of each of said sets having a selectable predetermined impedance, while another one of the circuits of each of said sets has a substantially constant impedance,
(b) a source of energy connected to said pair of control circuits,
(c) a vehicle-carried first pair of serially connected signal detectors each positioned on said vehicle to detect the presence of energy respectively in each one of said circuits of substantially constant impedance as said vehicle moves along said way,
(d) a second pair of vehicle-carried signal detectors each positioned on said vehicle to detect the presence of energy respectively in each of said circuits of selectable predetermined impedance as said vehicle moves along said way,
(e) a pair of signal phase comparators, each of said signal phase comparators connected respectively to one of said second pair of signal detectors,
(f) said first pair of serially connected signal detectors electrically connected to both of said signal phase comparators, said first pair of serially connected signal detectors providing a reference signal to said signal phase comparators,
each one of said second pair of signal detectors providing a signal to each of said signal phase comparators, which signal is indicative of the impedance present in said circuits having said selectable predetermined impedance,
each one of said signal phase comparators having an output which represents the phase differential between said reference signal and one of said signals from one of said second pair of signal detectors,

(g) a speed selector means controlled by said outputs from said pair of signal phase comparators, said speed selector means having an output which is a direct function of the combined impedances present in said circuits of selectable predetermined impedance as said vehicle moves along said way.

2. The vehicle speed control system of claim 1, wherein said pair of control circuits include a pair of rails on which said vehicle travels.

3. The vehicle speed control system of claim 2, wherein each of said sets of parallel circuits includes a portion of one rail of said pair of rails, which portion of said one rail constitutes said circuit of substantially constant impedance.

4. The vehicle speed control system of claim 1, wherein said sets of parallel control circuits are grouped to define a series of consecutive control sections along said way.

5. The vehicle speed control system of claim 1, wherein said pair of control circuits include a pair of rails on which said vehicle travels and each of said sets of parallel circuits includes a portion of one rail of said pair of rails, which portion of said one rail constitutes said circuit of substantially constant impedance and said sets of parallel control circuits which include said rails are grouped to define a series of consecutive control sections along said way.

6. The vehicle speed control system of claim 5, wherein each one of said circuits of preselected predetermined impedance is positioned between said pair of rails along said way.

7. The vehicle speed control system of claim 1, wherein said source of energy is of an alternating current coded energy source.

8. The vehicle speed control system of claim 1, wherein said vehicle-carried first pair of serially connected signal detectors are a pair of coils positioned on said vehicle to inductively detect the presence of energy in said circuits of substantially constant impedance.

9. The vehicle speed control system of claim 1, wherein a second pair of vehicle-carried signal detectors are a pair of coils positioned on said vehicle to inductively detect the presence of energy in said circuits of selectable predetermined impedance.

10. The vehicle speed control system of claim 1, wherein said signal phase comparators are comprised of a two winding relay, a first winding of each of said three-position relays being connected to said reference signal producing a first pair of serially connected signal detectors, a second winding of said three-position relays being responsive respectively to the presence of a lagging and leading current phase relative to the phase of the current of said reference signal whereby said signal phase comparators have three distinctive outputs dependent upon the phase of the current of the signals delivered by each one of said second pair of signal detectors.

11. The vehicle speed control system of claim 10, wherein said speed selector means receives one of said three distinctive outputs from each of said signal phase comparators, said speed selector means having a plurality of different outputs to control the speed of said vehicle.

12. The vehicle speed control system of claim 1, wherein said pair of control circuits include a pair of rails on which said vehicle travels and each of said sets of parallel circuits includes a portion of one rail of said pair of rails, which portion of said one rail constitutes said circuit of substantially constant impedance and said sets of parallel control circuits which include said rails are grouped to define a series of consecutive control sections along said way, said signal phase comparators having at least three distinctive outputs dependent upon the phase of the current of the signals delivered by each one of said second pair of signal detectors, said speed selector means having an output dependent upon the combined outputs from said signal phase comparators, which output is indicative of the particular control section which said vehicle occupies.

13. The vehicle speed control system of claim 7, wherein said first pair of signal detectors and said signal phase comparators have in series therewith a decoder means to extract the coded information present in said coded alternating energy.

14. A vehicle speed control system to control a vehicle's speed along a predetermined way comprised of,
(a) a pair of parallel control circuits positioned continuously along said predetermined way,
  each one of said pair of parallel circuits having in a portion thereof a series of electrically connected individual sets of parallel circuits,
  one circuit of each of said sets of parallel circuits having a preselected impedance, while another one of the circuits of each of said sets has a substantially constant impedance,
(b) a source of energy connected to said pair of control circuits,
(c) a vehicle-carried first pair of serially connected signal detectors, each positioned on said vehicle to inductively detect the presence of energy respectively in each one of said circuits of substantially constant impedance as said vehicle moves along said way,
(d) a second pair of vehicle-carried signal detectors, each positioned on said vehicle to inductively detect the presence of energy respectively in each of said circuits of preselected impedance as said vehicle moves along said way,
(e) a pair of signal phase comparators, each of said signal phase comparators connected respectively to one of said second pair of signal detectors,
(f) said first pair of serially connected signal detectors electrically connected to both of said signal phase comparators, said first pair of serially connected signal detectors providing a reference signal to said signal phase comparators,
  each one of said second pair of signal detectors providing a signal to each of said signal phase comparators, which signal is indicative of the impedance present in said circuits having said preselected impedance,
  each one of said signal phase comparators having an output which represents the phase differential between said reference signal and one of said signals from one of said second pair of signal detectors,
(g) a speed selector means controlled by said outputs from said pair of signal phase comparators, said speed selector means having an output which is a direct function of the combined impedance present in said circuits of preselected impedance as said vehicle moves along said way.

15. The vehicle speed control system of claim 14, wherein said pair of parallel control circuits include a pair of rails on which said vehicle travels and each of said sets of parallel control circuits includes a portion of one rail of said pair of rails, which portion of said one rail constitutes said circuit of substantially constant impedance.

16. The vehicle speed control system of claim 15, wherein said sets of parallel control circuits are grouped to define a series of consecutive control sections along said way.

17. The vehicle speed control system of claim 14, wherein said pair of control circuits include a pair of rails on which said vehicle travels and each of said sets of parallel circuits includes a portion of one rail of said pair of rails, which portion of said one rail constitutes said circuit of substantially constant impedance and said sets of parallel control circuits which include said rails are grouped to define a series of consecutive control sections along said way, said signal phase comparators having at least three distinctive outputs dependent upon the phase of the current of the signals delivered by each one of said second pair of signal detectors, said speed selector means having an output dependent upon the combined outputs from said signal phase comparators, which output is indicative of the particular control section which said vehicle occupies.

18. The vehicle speed control system of claim 14, wherein said source of energy is an alternating current coded energy source and a decoder means is electrically connected in series with said first pair of signal detectors and said signal phase comparators, whereby said decoder means extracts the coded information present in said coded alternating energy.

19. A train speed control system for trains operating in electrically continuous rail territory, comprised of (a) a pair of control circuits which circuits include said rails on which said train travels, each one of said pair of control circuits having in a portion thereof a series of electrically connected individual sets of parallel circuits, one circuit of each of said sets of parallel circuits having a preselected impedance, while another one of the circuits of each of said sets includes a portion of one of said rails, said parallel circuit of said set including said portion of rail having a substantially constant impedance, said sets of parallel circuits grouped to define a series of consecutive control sections along said rails, (b) a source of energy connected to said pair of control circuits, (c) a train-carried first pair of serially connected signal detectors each positioned on said train to inductively detect the presence of energy in said rails of each one of said circuits of substantially constant impedance as said train moves along said rails, (d) a second pair of train-carried signal detectors each positioned on said train to inductively detect the presence of energy respectively in each of said circuits of preselecting impedance as said train moves along said rails, (e) a pair of signal phase comparators, each of said signal phase comparators connected respectively to one of said second pair of signal detectors, (f) said first pair of serially connected signal detectors electrically connected to both of said signal phase comparators, said first pair of serially connected signal detectors providing a reference signal to said signal phase comparators, each one of said signal phase comparators having an output which represents the phase differential between said reference signal and one of said signals from one of said second pair of signal detectors, (g) a speed selector means controlled by said outputs from said pair of signal phase comparators, said speed selector means having an output dependent upon the combined outputs from said signal phase comparators, which outputs are indicative of the particular control section which said train occupies.

20. The train speed control system of claim 19, wherein said source of energy is an alternating current coded energy source and a decoder means is electrically connected in series with said first pair of signal detectors and said signal phase comparators, whereby said decoder means extracts the coded information present in said coded alternating energy.

References Cited

UNITED STATES PATENTS 1,539,877   6/1925   Shaver _____ 246—63

ARTHUR L. LA POINT, *Primary Examiner.*

S. T. KRAWCZEWICZ, *Assistant Examiner.*